(12) United States Patent
Ikoma (10) Patent No.: US 9,614,239 B2
(45) Date of Patent: Apr. 4, 2017

(54) FUEL CELL AND SEPARATOR

(71) Applicant: BROTHER KOGYO KABUSHIKI KAISHA, Nagoya-shi (JP)

(72) Inventor: Atsuki Ikoma, Okazaki (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 449 days.

(21) Appl. No.: 14/228,938

(22) Filed: Mar. 28, 2014

(65) Prior Publication Data
US 2015/0093663 A1    Apr. 2, 2015

(30) Foreign Application Priority Data

Sep. 30, 2013  (JP) ................. 2013-205635
Feb. 28, 2014  (JP) ................. 2014-038028

(51) Int. Cl.
*H01M 8/026*     (2016.01)
*H01M 8/04291*   (2016.01)
*H01M 8/1018*    (2016.01)

(52) U.S. Cl.
CPC ....... *H01M 8/04291* (2013.01); *H01M 8/026* (2013.01); *H01M 2008/1095* (2013.01)

(58) Field of Classification Search
CPC ......... H01M 2008/1095; H01M 8/026; H01M 8/04291; Y02E 60/50
See application file for complete search history.

(56) References Cited

U.S. PATENT DOCUMENTS

| | | |
|---|---|---|
| 6,884,536 B1 | 4/2005 | Hatoh et al. |
| 2004/0110057 A1 | 6/2004 | Yoshimoto et al. |
| 2007/0160893 A1 | 7/2007 | Nishimura et al. |
| 2007/0184327 A1 | 8/2007 | Ishioka et al. |

FOREIGN PATENT DOCUMENTS

| | | |
|---|---|---|
| JP | H05-251097 A | 9/1993 |
| JP | 2003-229144 A | 8/2003 |

(Continued)

OTHER PUBLICATIONS

Japanese Office Action mailed Oct. 23, 2015 issued in the corresponding Japanese Patent Application No. 2014-038028.

(Continued)

*Primary Examiner* — Basia Ridley
*Assistant Examiner* — Heng Chan
(74) *Attorney, Agent, or Firm* — Fox Rothschild LLP (57) ABSTRACT

A separator of a fuel cell may have a planer shape, may be provided on one surface of a membrane electrode assembly, and may include a first protrusion formed over a region between a first position which is provided a first distance apart from a first hole being pierced in the separator and a second position which is provided a second distance apart from a second hole being pierced in the separator on a first surface opposed to the membrane electrode assembly, the first protrusion abutting the membrane electrode assembly. The separator further may include a second protrusion formed over a region at least between the first position and the second hole on the first surface, the second protrusion abutting the electrode membrane assembly between the first position and the second position.

7 Claims, 7 Drawing Sheets

(56) References Cited

FOREIGN PATENT DOCUMENTS

| | | | |
|---|---|---|---|
| JP | 2004-213954 A | | 7/2004 |
| JP | 2004-342342 A | | 12/2004 |
| JP | 2004342342 A | * | 12/2004 |
| JP | 2006-252873 A | | 9/2006 |
| JP | 2007-188642 A | | 7/2007 |
| JP | 3939150 B2 | | 7/2007 |
| JP | 2007-213971 A | | 8/2007 |
| JP | 2008-103102 A | | 5/2008 |
| JP | 2009-076294 A | | 4/2009 |
| WO | 2009/123284 A1 | | 10/2009 |

OTHER PUBLICATIONS

International Search Report and Written Opinion of the International Searching Authority issued in PCT/JP2014/001894, mailed Jul. 1, 2014.

* cited by examiner

FUEL CELL AND SEPARATOR

CROSS-REFERENCE TO RELATED APPLICATIONS

This non-provisional application claims priority under 35 U.S.C. §119(a) on Patent Application No. 2013-205635 filed in Japan on Sep. 30, 2013 and Patent Application No. 2014-038028 filed in Japan on Feb. 28, 2014, the entire contents of which are hereby incorporated by reference.

TECHNICAL FIELD

The present disclosure relates to a fuel cell and a separator capable of easily discharging extra water generated in a unit cell.

BACKGROUND

In general, a fuel cell has a structure in which the unit cells are stacked. In each of the fuel cells, both surfaces of a membrane electrode assembly (MEA) are held by a pair of separators with gaskets interposed therebetween. A stacked body of the unit cells is generally referred to as a stack.

Among component parts of the fuel cell, the membrane electrode assembly includes a solid polymer electrolyte membrane. A cathode electrode and an anode electrode are disposed on both surfaces of the solid polymer electrolyte membrane. Each of these cathode electrode and anode electrode has a catalyst layer and a gas diffusion layer.

Meanwhile, among the component parts of the fuel cell, the separator is made of a plate-shaped member having conductivity. A plurality of flow path walls are formed on one surface of the separator. The plurality of flow path walls are flow path walls for causing an oxidizing gas to flow between the one surface of the separator and the cathode electrode. A plurality of flow path walls are also formed on the other surface of the separator. The plurality of flow path walls formed on the other surface are flow path walls for causing a fuel gas to flow between the other surface and the anode electrode. Holes serving as a gas introduction path and a gas discharge path are formed at both ends of the flow path walls, respectively. The holes respectively formed at both ends of the flow path walls communicate with each other when the stack is configured. The holes communicating at both ends of the unit cells form a series of gas introduction path and a series of gas discharge path.

In such a fuel cell, hydrogen is decomposed into a hydrogen ion and an electron at the anode electrode. The hydrogen ion passes through the solid polymer electrolyte membrane to the cathode electrode, and the electron passes through a plurality of flow path walls which come in contact with the cathode electrode and moves to the cathode electrode. The cathode electrode causes the hydrogen ion and the electron to react with oxygen to generate water. In addition, the water generated at the cathode electrode side is reversely diffused toward the anode electrode side through the solid polymer electrolyte membrane.

In a conventional method, a plurality of protrusions are formed between flow path walls of a separator and holes of the separator, that do not couple with the flow path walls. The plurality of protrusions of the separator support a gasket.

SUMMARY

In the conventional method, the water generated at the cathode electrode is discharged along the plurality of flow path walls. However, the plurality of protrusions are arranged apart from the plurality of flow path walls. For this reason, the discharged water collides with the plurality of protrusions and may remain in a region between the plurality of flow path walls and the plurality of protrusions. As a result, the flow of the gas from the cathode electrode to the holes is blocked, and a power generation capacity of the fuel cell is decreased.

In addition, like the anode electrode side, when the water generated at the cathode electrode is reversely diffused at the anode electrode through the solid polymer electrolyte membrane, even at the anode electrode, the water remains in the region between the plurality of flow path walls and the plurality of the protrusions, and a power generation capacity of the fuel cell is decreased.

In addition, there is a method for reducing the number of flow path walls. In a case where the number of flow path walls is reduced, a contact area between the membrane electrode assembly and the plurality of flow path walls reduces. The reduction of the contact area between the membrane electrode assembly and the plurality of flow path walls causes the reduction of the number of flowing electrons, thereby a power generation capacity of the fuel cell is decreased.

The present disclosure has been made in consideration of these problems, and an object thereof is to provide a fuel cell and a separator capable of simultaneously solving bending of the gasket and the residue of the water to be discharged, by extending a part of the plurality of flow path walls to the holes, thereby ensuring improved power generation capacity.

In order to accomplish the object, the fuel cell of the present disclosure is that a fuel cell may comprise: a membrane electrode assembly having a planar shape; a first separator having a planar shape and provided on one surface of the membrane electrode assembly, the first separator including: a first protrusion formed over a region between a first position which is provided a first distance apart from a first hole being pierced in the first separator and a second position which is provided a second distance apart from a second hole being pierced in the first separator, on a first surface opposed to the membrane electrode assembly, the first protrusion abutting the membrane electrode assembly; and a second protrusion formed over a region at least between the first position and the second hole on the first surface, the second protrusion abutting the membrane electrode assembly between the first position and the second position; and a gasket provided between the membrane electrode assembly and the first separator, the gasket being formed with a through-hole being pierced in the gasket at a position corresponding to the first protrusion and the second protrusion between the first position and the second position, and with through-holes being pierced in the gasket at positions corresponding to the first hole and the second hole, respectively.

Moreover, in order to accomplish the object, the separator of the present disclosure is that a separator having a planer shape may comprise: a first protrusion formed over a region between a first position which is provided a first distance apart from a first hole being pierced in the separator and a second position which is provided a second distance apart from a second hole being pierced in the separator, on a first surface of the separator; and a second protrusion formed over a region at least between the first position and the second hole on the first surface.

According to the fuel cell and the separator of the present disclosure, bending of the gasket and the residue of the extra water to be discharged can be simultaneously solved, thereby ensuring improved power generation capacity.

The above and further objects and features will more fully be apparent from the following detailed description of preferred embodiments with reference to accompanying drawings.

DETAILED DESCRIPTION

First Embodiment

Hereinafter, a polymer electrolyte fuel cell, a separator and a gasket that constitute the same according to an embodiment of the present disclosure will be described with reference to the drawings.

<Entire Structure>

Figure 1:
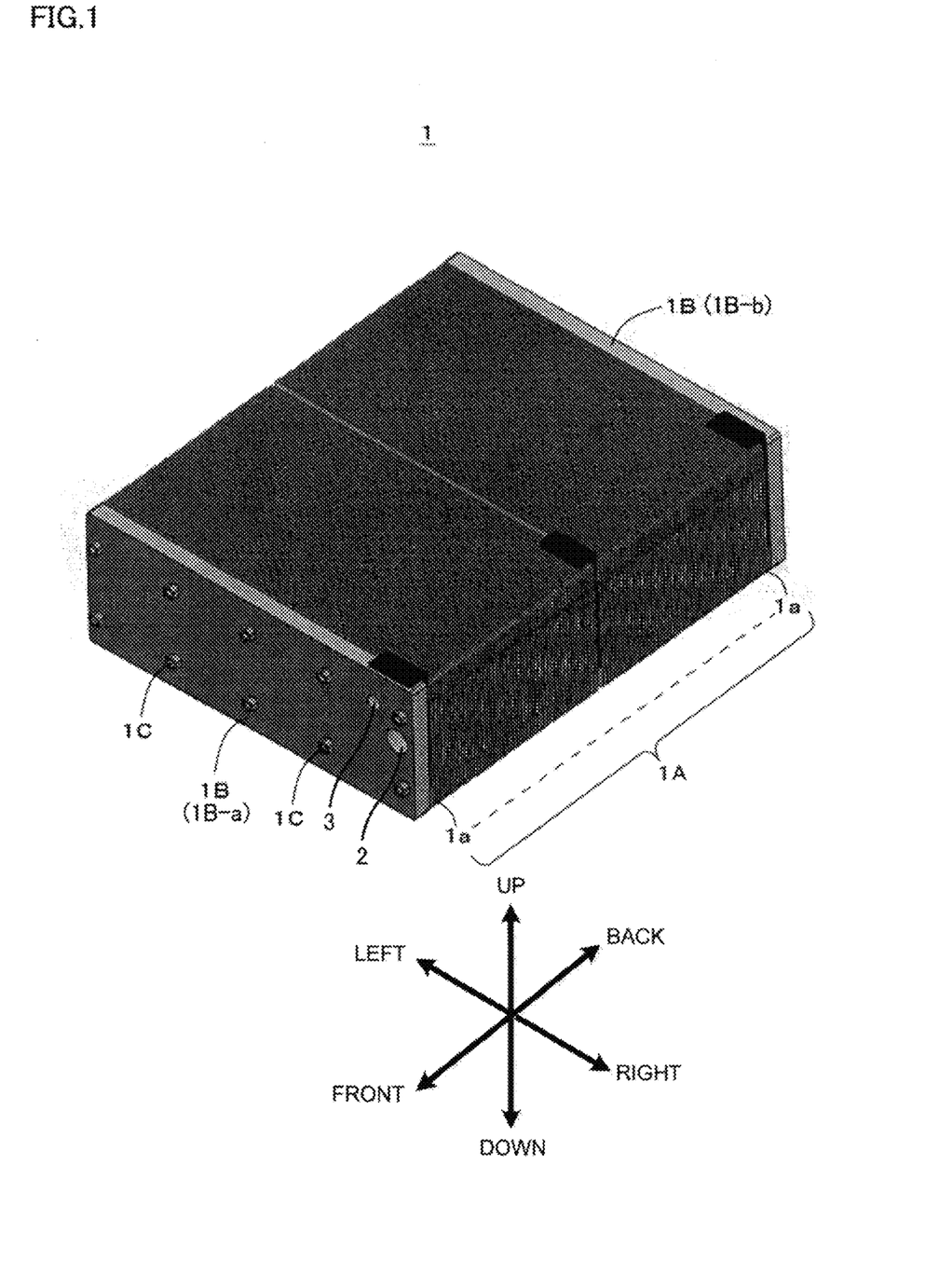
FIG. 1 is a perspective view showing a polymer electrolyte fuel cell according to an embodiment.

In FIG. 1, a polymer electrolyte fuel cell 1 of the embodiment comprises a stack 1A, a pair of end plates 1B, and a plurality of bolts 1C. The stack 1A includes a plurality of unit cells 1a stacked on one another. The pair of end plates 1B each has a rectangular planer shape. The plurality of unit cells 1a are stacked along a front-and-back direction, as shown in FIG. 1. The front-and-back direction is a direction in which the plurality of unit cells 1a are stacked. Moreover, as shown in FIG. 1, a long-side direction of the rectangle constituting each of the pair of end plates 1B is a right-and-left direction, and a short-side direction of the rectangle constituting each of the pair of the end plates 1B is an upper-and-lower direction. The pair of end plates 1B holds both ends of the stack 1A in the front-and-back direction. The plurality of bolts 1C fix the stack 1A and the pair of end plates 1B to each other. Some of the plurality of bolts 1C pass through either of the pair of end plates 1B to fix either of the pair of end plates 1B and the stack 1A to each other. Moreover, the rest of the plurality of bolts 1C pass through both the pair of end plates 1B to fix the pair of the end plates 1B and the stack 1A.

As shown in FIG. 1, in one end plate 1B-a of the pair of end plates, a first gas hole 2 is formed. Furthermore, as shown in FIG. 1, a second gas hole 3 is formed in the end plate 1B-a. Moreover, in another end plate 1B-b of the pair of end plates, a third gas hole (not shown) is formed. Furthermore, in the end plate 1B-b, a fourth gas hole (not shown) is formed. The first gas hole 2 is formed at one end of the end plate 1B-a along the right-and-left direction, and the first gas hole 2 and the second gas hole 3 are formed at different positions in the end plate 1B-a. Moreover, the third gas hole is formed at the other end of the end plate 1B-b along the right-and-left direction, and the third gas hole and the fourth gas hole are formed at different positions in the end plate 1B-b. The first gas hole 2 and the second gas hole 3 are through-holes that are pierced in the end plate 1B-a. Similarly, the third gas hole and the fourth gas hole are also through-holes that are pierced in the end plate 1B-b.

Figure 2:
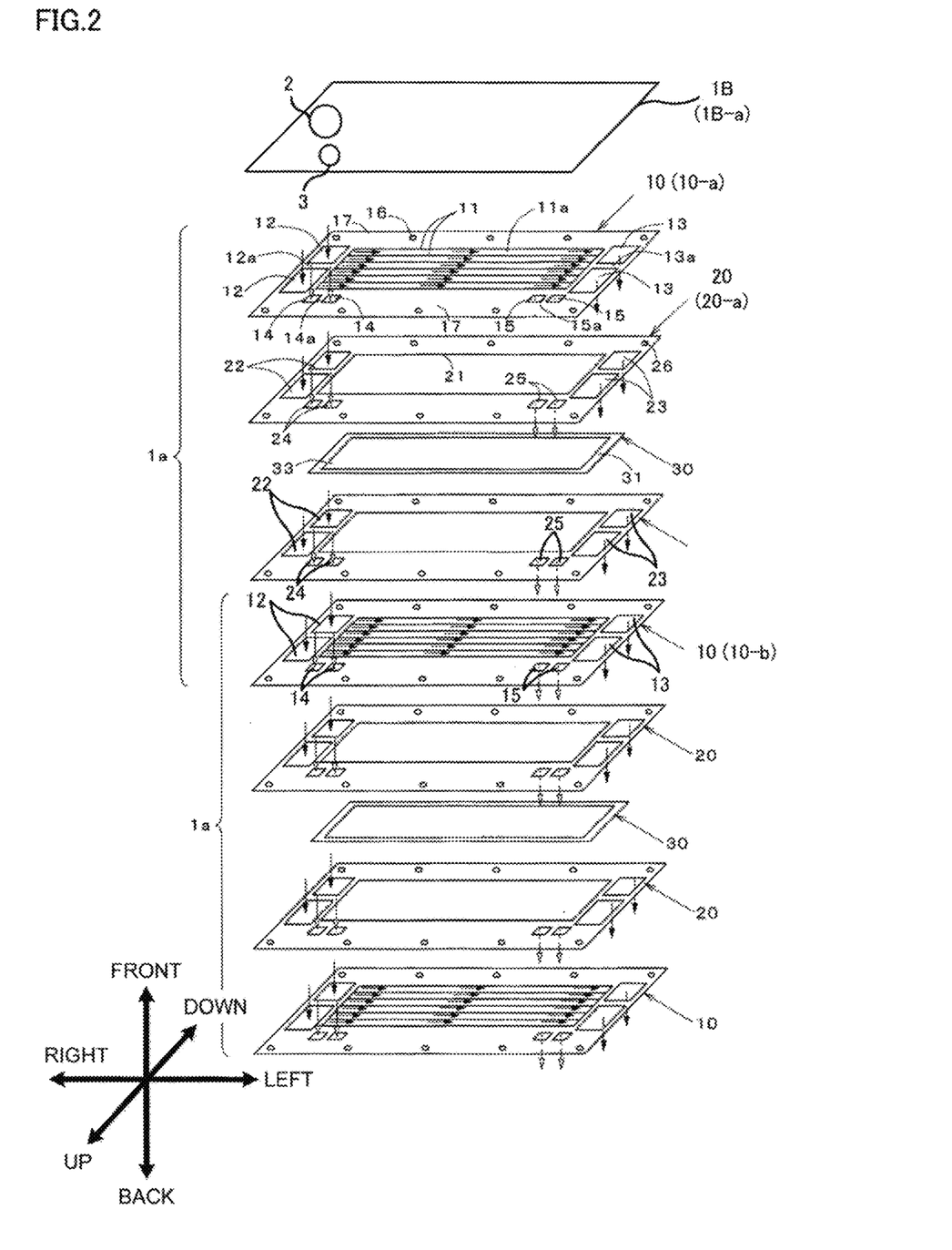
FIG. 2 is an exploded perspective view showing a structure of a stack 1A of the polymer electrolyte fuel cell.

As shown in FIG. 2, each of the unit cells 1a comprises a membrane electrode assembly (MEA) 30, a pair of gaskets 20, and a pair of separators 10.

One gasket 20-a of the pair of gaskets 20 comes into contact with a front surface of the membrane electrode assembly 30, and another gasket 20-b of the pair of gaskets 20 comes into contact with a back surface of the membrane electrode assembly 30. The pair of separators 10 hold both surfaces of the membrane electrode assembly 30 that the gaskets 20 come into contact with, respectively. Hereinafter, the pair of separators 10, the pair of gaskets 20 and the membrane electrode assembly 30 of the polymer electrolyte fuel cell 1 shown in FIG. 2 will be sequentially described.

<Membrane Electrode Assembly>

As shown in FIG. 2, the membrane electrode assembly 30 has a rectangular planer shape. The membrane electrode assembly 30 includes a solid polymer electrolyte membrane 31, a cathode electrode 32 (see FIG. 5B) and an anode electrode 33. The cathode electrode 32 and the anode electrode 33 are provided on both surfaces of the solid polymer electrolyte membrane 31. Specifically, in FIG. 2, the anode electrode 33 is provided on the front surface of the membrane electrode assembly 30. Moreover, in FIG. 2, the cathode electrode 32 (see FIG. 5B) is provided on the back surface of the membrane electrode assembly 30. Each of the cathode electrode 32 and the anode electrode 33 has a catalyst layer and a gas diffusion layer, which are not shown.

<Gasket>

The gasket 20 is made of a rectangular sheet material. For example, an elastic body, such as rubber, an elastomer and the like, processed so as to have an extremely small thickness may be used as the sheet material that forms the gasket 20. The gasket 20 has a rectangular planer shape. The gasket 20 is formed with a first through-hole 21, second through-holes 22, third through-holes 23, fourth through-holes 24, fifth through-holes 25, and sixth through-holes 26. The first through-hole 21, the second through-holes 22, the third through-holes 23, the fourth through-holes 24, the fifth through-holes 25, and the sixth through-holes 26 are each a hole being pierced in the gasket 20 in the front-and-back direction.

The largest rectangular first through-hole 21 is formed in the center of the gasket 20. An outer shape of the first through-hole 21 in the gasket 20 corresponds to that of a substantially rectangular region where a plurality of first flow path walls 11 or a plurality of second flow path walls 19 of the separator 10, which will be described later, are formed. Moreover, a position of the first through-hole 21, in the gasket 20 corresponds to that of the substantially rectangular region where the plurality of the first flow path walls 11 or the plurality of second flow path walls 19 of the separator 10, which will be described later, are formed. In addition, the outer shape of the first through-hole 21 in the gasket 20 also corresponds to those of the cathode electrode 32 and the anode electrode 33 provided on both surfaces of the membrane electrode assembly 30. Moreover, the position of the first through-hole 21 in the gasket 20 corresponds to those of the cathode electrode 32 and the anode electrode 33 provided on both surfaces of the membrane electrode assembly 30.

In the embodiment, the first through-hole 21, the second through-holes 22, the third through-holes 23, the fourth through-holes 24, the fifth through-holes 25, and the sixth through-holes 26 are formed at different positions of the gasket 20, respectively. Specifically, in the example of FIG. 2, the two second through-holes 22 are formed along the upper-and-lower direction on a right end side of the gasket 20. Moreover, the two third through-holes 23 are formed along the upper-and-lower direction on a left end side of the gasket 20. In the embodiment, an outer shape and positions of the second through-holes 22 correspond to those of first holes 12 of the separator 10, which will be described later, respectively. Moreover, an outer shape and positions of the third through-holes 23 correspond to those of second holes 13 of the separator 10, which will be described later, respectively.

Furthermore, in the example of FIG. 2, the two fourth through-holes 24 are formed along the right-and-left direction on an upper end side of the gasket 20 and on the right end side of the gasket 20. Moreover, the two fifth through-holes 25 are formed along the right-and-left: direction on the upper end side of the gasket 20 and on the left end side of the gasket 20. In the embodiment, an outer shape and positions of the fourth through-holes 24 correspond to those of third holes 14 of the separator 10, which will be described later, respectively. Moreover, an outer shape and positions of the fifth through-holes 25 correspond to those of fourth holes 15 of the separator 10, which will be described later, respectively.

The plurality of sixth through-holes 26 are formed in the vicinity of respective long sides of the rectangle of the gasket 20. In the example of FIG. 2, the plurality of sixth through-holes 26 are formed at regular intervals in the gasket 20. In the example of FIG. 2, the plurality of sixth through-holes 26 along the long side in the upper direction are formed on an outer side of the gasket 20 with respect to the fourth through-holes 24 and the fifth through-holes 25. An outer shape and positions of the plurality of sixth through-holes 26 correspond to those of a plurality of insertion holes 16 of the separator 10, which will be described later, respectively.

<Separator>

The separator 10 is made of a rectangular metal plate. For example, the separator 10 is produced, using aluminum. The separator 10 may be produced, using carbon or stainless steel. In the embodiment, carbon is applied onto aluminum. The separator 10 has a rectangular planar shape of almost the same dimensions as those of the gasket 20 or the end plate 1B. The separator 10 is formed with the plurality of first flow path walls 11, the first holes 12, the second holes 13, the third holes 14, the fourth holes 15, and the insertion holes 16. The first holes 12, the second holes 13, the third holes 14, the fourth holes 15, and the insertion holes 16 are each a through-hole being pierced in the separator in the front-and-back direction.

In the embodiment, the first holes 12, the second holes 13, the third holes 14, the fourth holes 15, and the insertion holes 16 are formed at different positions of the separator 10, respectively. Specifically, in the example of FIG. 2, the two first holes 12 are formed along the upper-and-lower direction on a right end side (one shorter side) of the separator 10. Moreover, the two second holes 13 are formed along the upper-and-lower direction on a left end side (the other shorter side) of the separator 10. Furthermore, in the example of FIG. 2, the two third holes 14 are formed along the right-and-left direction on an upper end side of the separator 10, and on the right end side of the separator 10. In addition, the two fourth holes 15 are formed along the right-and-left direction on the upper end side of the separator 10, and on the left end side of the separator 10. The two first holes 12 in the separator 10 are formed at a position corresponding to the first gas hole 2 in the end plate 1B-a. Moreover, the two third holes 14 in the separator 10 are formed at a position corresponding to the second gas hole 3 in the end plate 1B-a.

The plurality of first flow path walls 11 are provided at the center of the front surface of the separator 10 shown in FIG. 2 at predetermined distances in parallel to each other. As shown in FIG. 2, the first flow path walls 11 each include a first groove portion 11a extending from a vicinity of the two first holes 12 to a vicinity of the two second holes 13 along the right-and-left direction. Specifically, the first flow path walls 11 each include the first groove portion 11a continuously extending from a first position which is provided a predetermined first distance apart from the two first holes 12 in the left direction to a second position which is provided a predetermined second distance apart from the two second holes 13 in the right direction. The first groove portion 11a is formed by extending a depressed portion, which is depressed from a planar surface of the separator 10, from the first position to the second position. The first groove portions 11a shown in FIG. 2 may be each constituted by a continuously extending protrusion, which is protruded from the planar surface of the separator 10. The outer shape and position of the substantially rectangular region including the plurality of first flow path walls 11 corresponds to an outer shape and a position of the cathode electrode 32 provided on the back surface of the membrane electrode assembly 30.

In the example of FIG. 2, the oxidizing gas flowing in from the first gas hole 2 passes through the two first holes 12 of the separator 10, and further passes through the second through-holes 22 of the gasket 20. In the embodiment, the oxidizing gas is air existing outside the polymer electrolyte fuel cell 1. As the oxidizing gas, a gas including oxygen ($O_2$) may be employed. Moreover, the oxidizing gas flowing in from the first gas hole 2 flows from the two first holes 12 to the two second holes 13 along the first groove portions 11a of the respective first flow path walls 11. When the gasket 20 is disposed in the front direction of the plurality of first flow path walls 11, the cathode electrode 32 of the membrane electrode assembly 30 and the plurality of first flow path walls 11 of a separator 10-b come into contact with each other through the first through-hole 21 of the gasket 20. Accordingly, the oxidizing gas can flow along the first groove portions 11a of the respective first flow path walls 11. This allows the oxidizing gas to be supplied to the cathode electrode of the membrane electrode assembly 30. The first flow path walls 11 are each, for example, a straight type flow path wall. In the embodiment, as shown in FIG. 2, the two first holes 12 are partitioned by a partition wall 12a. Also, the two second holes 13 are partitioned by a partition wall 13a. Moreover, the two third holes 14 are partitioned by a partition wall 14a. Also, the two fourth holes 15 are partitioned by a partition wall 15a. The two first holes 12, the two second holes 13, the two third holes 14, and the two fourth holes 15 may be each one rectangular hole resulting from joining the respective two holes. In the embodiment, in order to increase strength of the separator 10, the partition walls 12a, 13a, 14a, 15a each serving as a beam are provided between the respective two holes.

Figure 3:
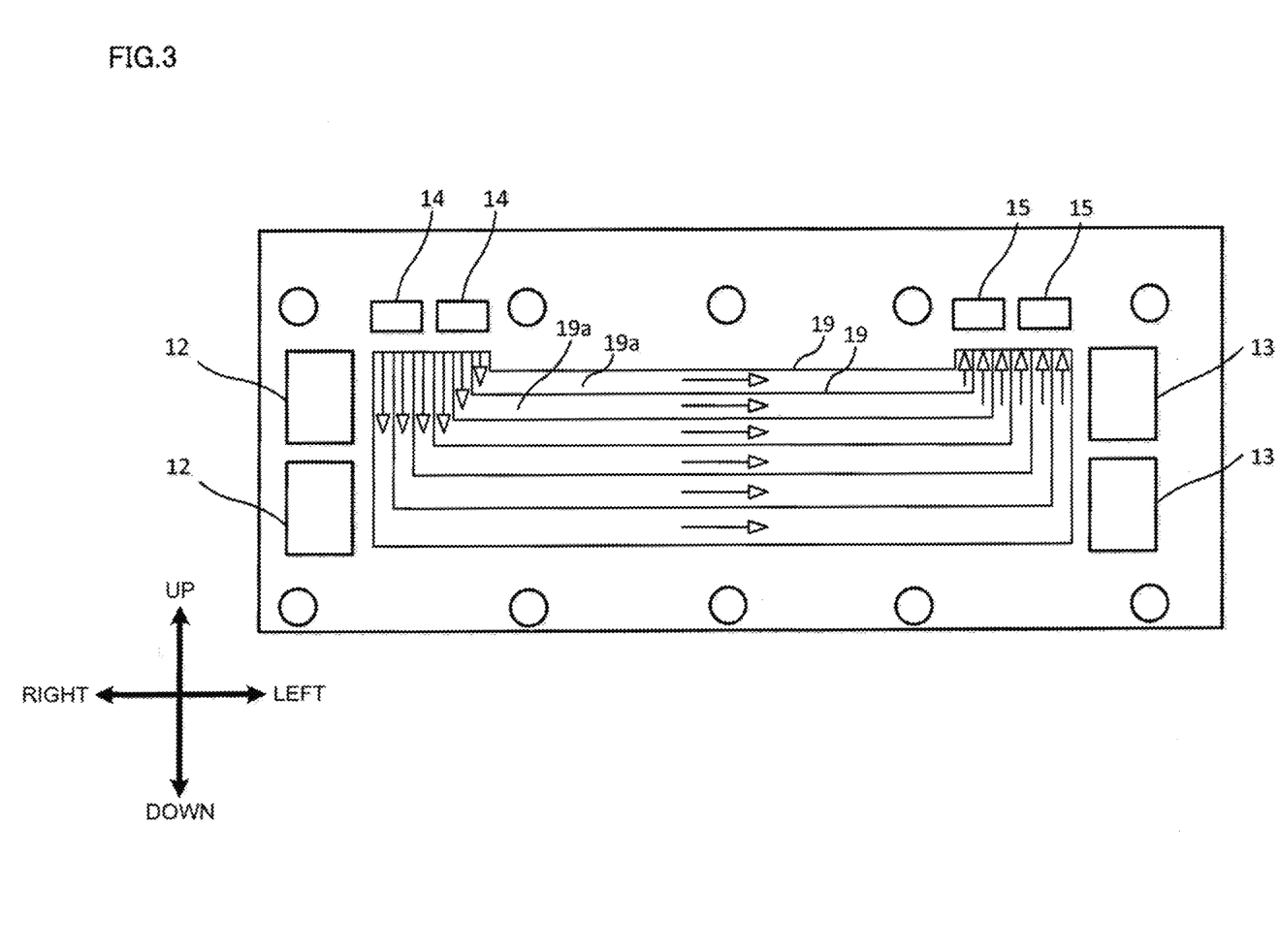
FIG. 3 is a plan view of a separator 10 when seen from a back direction.

As shown in FIG. 3, the plurality of second flow path walls 19 are formed on the surface opposite to the surface where the first flow path walls 11 of the separator 10 are formed. The plurality of second flow path walls 19 are formed at predetermined distances side by side on the back surface of the separator 10 shown in FIG. 3. As shown in FIG. 3, the second flow path walls 19 each include a second groove portion 19a extending from a vicinity of the two third holes 14 along the upper-and-lower direction. Specifically, the second flow path walls 19 each include the second groove portion 19a continuously extending from a third position which is provided a predetermined third distance apart from the two third holes 14 in the down direction. The second groove portion 19a of each of the second flow path walls 19 extends along the right-and-left direction, and further extends toward the two fourth holes 15 along the upper-and-lower direction. Specifically, the second groove portion 19a of each of the second flow path walls 19 continuously extends to a fourth position which is provided a predetermined fourth distance apart from the two fourth holes 15 in the down direction. The second groove portions 19a shown in FIG. 3 are each constituted by a continuously extending depressed portion, which is depressed from the planar surface of the separator 10. The second groove portions 19a shown in FIG. 3 may be each constituted by a continuously extending protrusion, which is protruded from the planar surface of the separator 10. The outer shape and position of the region including the plurality of second flow path walls 19 correspond to an outer shape and a position of the anode electrode 33 provided on the front surface of the membrane electrode assembly 30. The second flow path walls 19, which are different from the straight type first flow path walls 11, are each a serpentine type flow path wall, in which both ends of the second flow path wall 19 along the right-and-left direction are bent at a right angle toward the third hole 14 and the fourth hole 15, respectively.

In the example of FIG. 3, the fuel gas flowing in from the second gas hole 3 passes through the two third holes 14 of the separator 10. In the embodiment, the fuel gas is hydrogen ($H_2$). As the fuel gas, a gas including hydrogen ($H_2$) may be employed. The fuel gas (a second medium), which has passed through the two third holes 14, passes through the fourth through-holes 24 of the gasket 20-a. Furthermore, the fuel gas, which has passed through the two third holes 14, flows from the two third holes 14 to the two fourth holes 15 along the second groove portions 19a of the respective second flow path walls 19 in FIG. 3. Particularly, the anode electrode 33 of the membrane electrode assembly 30 comes into contact with the plurality of second flow path walls 19 of a separator 10-a through the first through-hole 21 of the gasket 20-a. Accordingly, the fuel gas can flow along the second groove portions 19a of the respective second flow path walls 19. This allows the fuel gas to be supplied to the anode electrode 33 of the membrane electrode assembly 30.

Furthermore, in the vicinity of respective long sides of a rectangle of the separator 10, the plurality of insertion holes 16 are formed. In the example of FIG. 2, the plurality of insertion holes 16 are formed at regular intervals in the separator 10. In the embodiment, in order to increase strength of the separator 10, the third holes 14 and the fourth holes 15 are formed in regions between the adjacent two insertion holes 16, respectively.

The plurality of bolts 1C are inserted into the plurality of insertion holes 16, respectively. A diameter of the insertion holes 16 is larger than a diameter of the bolts 1C by 3 mm or more. When each of the bolts 1C is inserted into each of the insertion holes 16, a clearance of 1.5 mm or more is formed between the insertion hole 16 and the bolt 1C. As a result, the separator 10 and the bolts 1C are securely insulated.

A distance between the adjacent insertion holes 16 along each of the long sides of the separator 10 is 80 mm or less. When the distance between the insertion holes 16 is 80 mm or less, the sealability between the separator 10 and the gasket 20 is increased, and particularly, leakage of the fuel gas is effectively prevented. Preferably, the distance between the insertion holes 16 is about 60 mm±1 mm.

Here, the polymer electrolyte fuel cell 1 of the embodiment is of an air cooling type. In the polymer electrolyte fuel cell 1 of the embodiment, regions between the long sides of the rectangle of the separator 10, and both ends of the plurality of the first flow path walls 11 in the upper-and-lower direction are each a heat radiation unit 17. As shown in FIG. 1, when the plurality of unit cells 1a are stacked, the heat radiation units 17 of the respective separators 10 form a plurality of fins and a wide heat radiation area is provided. The polymer electrolyte fuel cell 1 is, for example, a fuel cell including the solid polymer electrolyte membrane 31. The polymer electrolyte fuel cell 1 may be a general fuel cell. The general fuel cell is, for example, a fuel cell using a membrane other than the solid polymer electrolyte membrane 31.

<Principle of Power Generation>

As described above, the fuel gas is supplied to the anode electrode 33 of the membrane electrode assembly 30. The fuel gas is supplied along the plurality of the second flow path walls 19 of the separator 10, and is diffused by the diffusion layer of the anode electrode 33. The fuel gas is decomposed into a hydrogen ion and an electron by the catalyst layer. The hydrogen ion passes through the solid polymer electrolyte membrane 31, and moves to the cathode electrode. The electron passes through the separator 10, which is a conductor, and moves to the cathode electrode. In the cathode electrode 32, as described above, the oxidizing gas flowing along the plurality of first flow path walls 11, and the moved hydrogen ion and electron are reacted at the catalyst layer to generate water. Here, electricity is generated by the reverse principle of electrolysis of water. The generated water and/or gas flow along the plurality of the first flow path walls 11 and pass through the second holes 13. Moreover, the water and/or gas generated in the membrane electrode assembly 30 pass through the fourth holes 15.

<<Second Protrusion 18>>

Next, second protrusions 18 formed at the separator of the embodiment will be described with reference to FIGS. 4A and 4B and FIGS. 5A and 5B.

As described above, the polymer electrolyte fuel cell 1 generates water at the cathode electrode 32 of the unit cell 1a to generate electricity. The water generated at the cathode electrode 32 passes through the first groove portions 11a of the separator 10 to be discharged from the second holes 13. However, when the water to be discharged from the second holes 13 remains on the way, the path of the oxidizing gas is blocked by the extra water, and a power generation capacity of the polymer electrolyte fuel cell 1 is decreased.

In addition, when the water generated at the cathode electrode 32 of the unit cell 1a is reversely diffused to the anode electrode 33 through the solid polymer electrolyte membrane 31, the path of the fuel gas of the separator 10 is blocked by the water, and power generation capacity of the polymer electrolyte fuel cell 1 is further decreased.

Figure 4A:
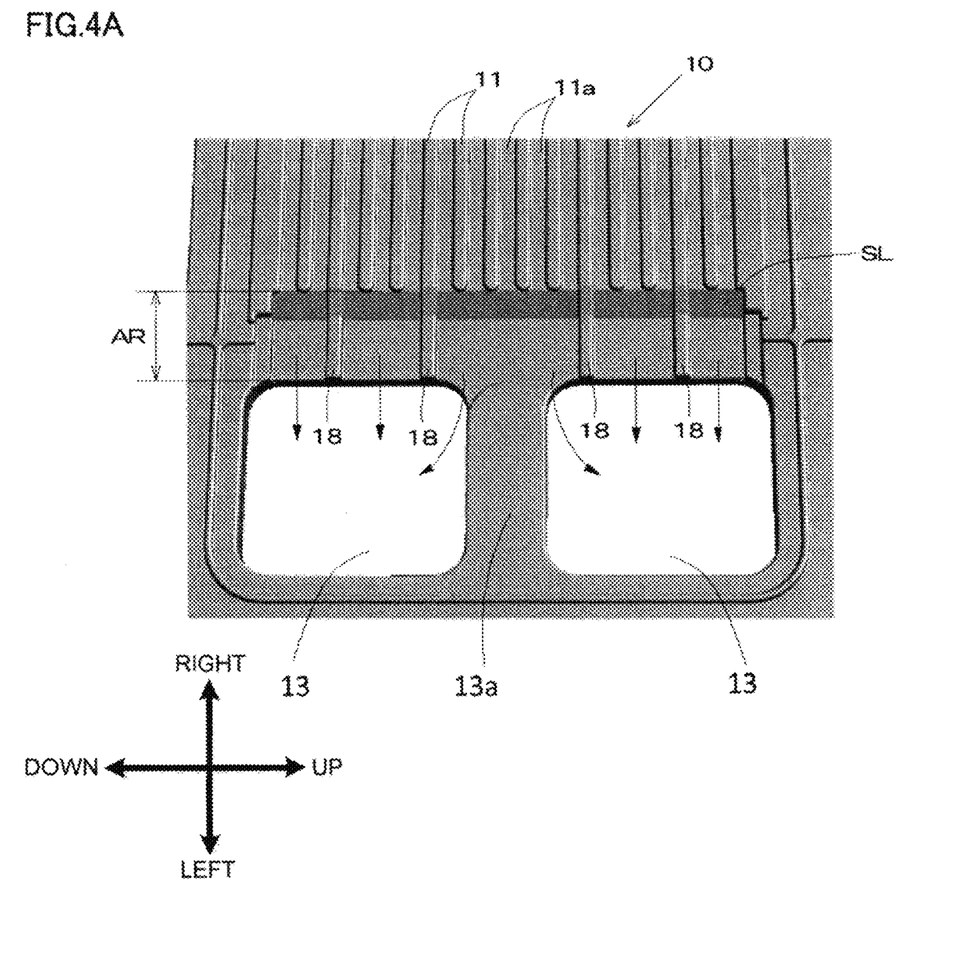
FIG. 4A is a partial enlarged plan view showing the main portion of the separator according to a first embodiment.
Figure 4B:
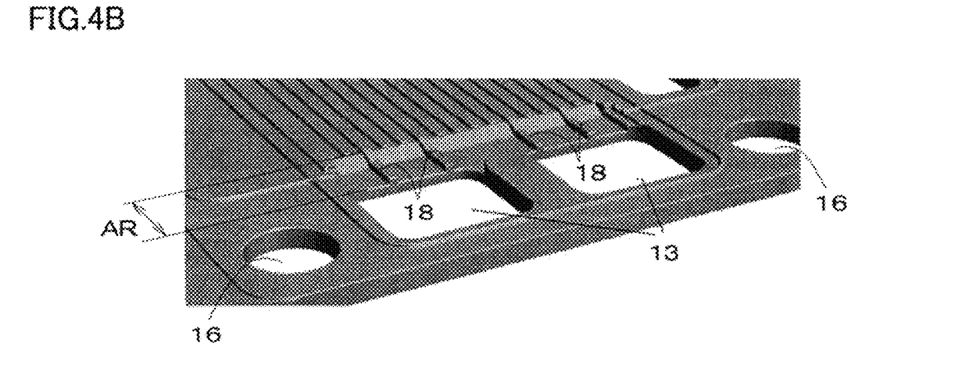
FIG. 4B is a partial enlarged perspective view showing the main portion of the separator according to the first embodiment.

In this respect, as shown in FIGS. 4A and 4B, the separator 10 of the embodiment includes four second protrusions 18 formed in a region AR between left ends of the first flow path walls 11 and the second holes 13.

Like the first flow path walls 11, the second protrusions 18 are each a protrusion formed integrally with the corresponding first flow path wall 11 on a surface of the metallic separator 10 through die casting. As shown in FIG. 4A, a right end of each of the second protrusions 18 continues to the corresponding first flow path wall 11. Since the right end of each of the second protrusions 18 continues to the corresponding first flow path wall 11 in this manner, there is no clearance between each of the second protrusions 18 and the corresponding first flow path wall 11, thereby preventing water from remaining in the region AR, which is the path of the water. Moreover, in place of being formed integrally with the corresponding first flow path wall 11, each of the second protrusions 18 may be configured by connecting the right end of the second protrusion 18 to the corresponding first flow path wall 11. A left end of each of the second protrusions 18 continues to the second hole 13. Since the left end of each of the second protrusions 18 continues to the second hole 13 in this manner, a path extending from the first flow path walls 11 to the second holes 13 is defined. Accordingly, water flowing along the first flow path walls 11 is guided to the second holes 13. Note that the first flow path wall(s) 11 which is not formed integrally with the second protrusion(s) 18 corresponds to a first protrusion(s) in claims.

In a first embodiment, the second protrusions 18 are formed integrally with some of the first flow path walls 11 and not with all of the first flow path walls 11. As a result, one or a plurality of first flow path walls 11 not formed integrally with the second protrusions 18 are arranged between the first flow path walls 11 formed integrally with the two second protrusions 18 which are adjacent to each other in the upper-and-lower direction in the region AR. In such a configuration, a width of a path formed by the two second protrusions 18 which are adjacent to each other in the upper-and-lower direction in the region AR is large, and thereby water flowing in along the first flow path walls 11 flows out to the second holes 13 smoothly. Note that in first embodiment, the number of the first flow path walls 11 (first protrusions) which are not formed integrally with the second protrusions 18 is larger than the number of the second protrusions 18.

In the first embodiment, a width of each of the second protrusions 18 in the upper-and-lower direction is the same as that of each of the first flow path walls 11 in the upper-and-lower direction.

Figure 5A:
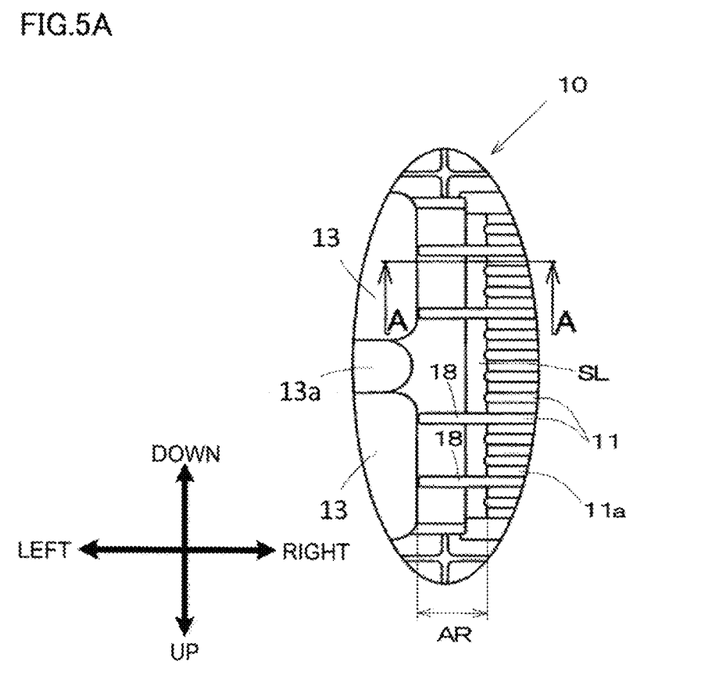
FIG. 5A is a partial plan view showing the main portion of the separator.
Figure 5B:
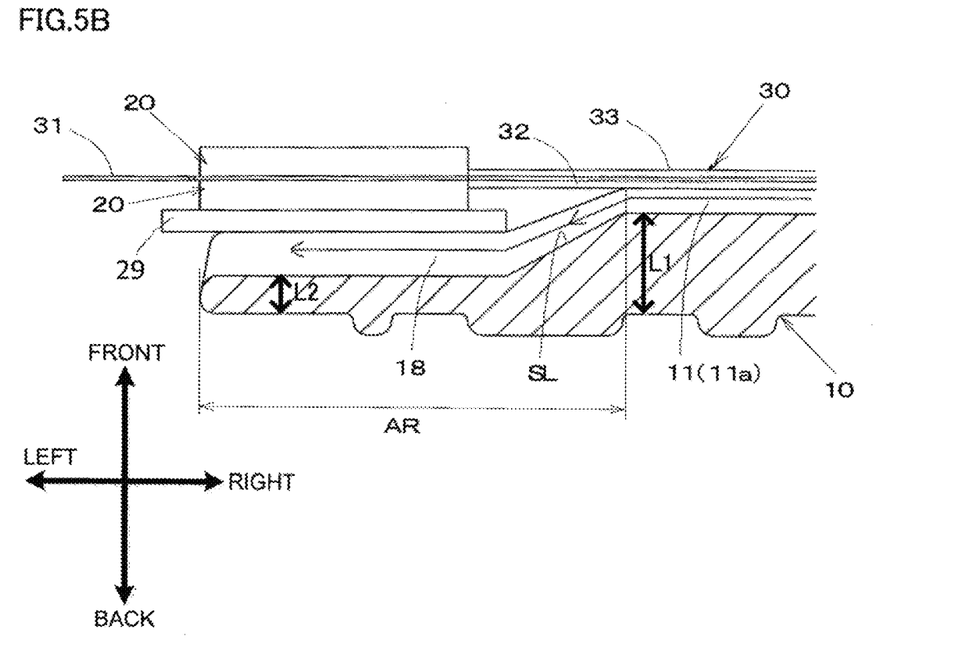
FIG. 5B is a cross-sectional view taken along a line A-A of FIG. 5A.

As shown in FIG. 5B, the second protrusions 18 protrude in the front direction in the region AR. The second protrusions 18 support the gasket 20, thereby preventing bending of the gasket 20. Specifically, as shown in FIG. 5B, a rectangular bridge plate 29 is provided in the front direction of the second protrusions 18. The rectangular bridge plate 29 is provided over the region AR in the upper-and-lower direction. Accordingly, the second protrusions 18 indirectly support a part of the gasket 20 via the bridge plate 29. In the first embodiment, in the separator 10, a thickness L2 of the region AR in the front-and-back direction is smaller than a thickcness L1 of a region in which the first flow path walls 11 are formed in the front-and-back direction. In addition, between the left ends of the first flow path walls 11 and the second holes 13, an inclined surface SL is formed in the separator 10 along the right-and-left direction. In an example of FIG. 5B, the inclined surface SL is formed from the left ends of first flow path walls 11 and a planar surface which is not inclined is formed in the separator 10 to the second holes 13. In such a configuration, water flowing in along the first flow path walls 11 flows into the region AR along the inclined surface SL smoothly, and then the water is efficiently discharged to the second holes 13 along the path defined by the second protrusions 18.

A height of the second protrusions 18 is larger than a thickness of the bridge plate 29.

Here, in the first embodiment, as shown in FIG. 2, the first holes 12, the second holes 13, the third holes 14 and the fourth holes 15 are partitioned into two portions each by corresponding partition walls 12a, 13a, 14a and 15a. Each of the two first holes 12, the two second holes 13, the two third holes 14 and the two fourth holes 15 may be one rectangular opening formed by joining the two holes. In the first embodiment, in order to improve strength of the separator 10, the partition walls 12a, 13a, 14a and 15a which function as beams are formed at centers of the two first holes 12, the two second holes 13, the two third holes 14 and the two fourth holes 15, respectively.

Then, in the first embodiment, as shown in FIGS. 4A and 4B, all of the second protrusions 18 in the region AR are formed at positions different, in the upper-and-lower direction, from a position the partition wall 13a is formed. Accordingly, as indicated by arrows of FIG. 4A, the water flowing in along the path defined by the two central second protrusions 18 shown in FIG. 4A is discharged to the second holes 13. In particular, in the first embodiment, since an end portion of the partition wall 13a at a side of the second protrusions 18 has a semi-circular shape, the water flowing in the path defined by the two central second protrusions 18 shown in FIG. 4A is guided to the two second holes 13 along the semi-circular end portion.

In addition, in the first embodiment, as shown in FIG. 4A, the total width of all of the first flow path walls 11 in the upper-and-lower direction is substantially the same as a distance between an upper end of the second hole 13 disposed in the upper direction and a lower end of the second hole 13 disposed in the lower direction. Accordingly the water flowing in along the entire first flow path walls 11 is smoothly discharged to the two second holes 13. Also, the total width of all of the first flow path walls 11 in the upper-and-lower direction is substantially the same as a distance between an upper end of the first hole 12 disposed in the upper direction and a lower end of the first hole 12 disposed in the lower direction. Moreover, the total width of all of the second flow path walls 19 in the right-left direction in the vicinity of the third holes 14 is substantially the same as a distance between a left end of the third hole 14 disposed in the left direction and a right end of the third hole 14 disposed in the right direction. Also, the total width of all of the second flow path walls 19 in the right-and-left direction in the vicinity of the fourth holes 15 is substantially the same as a distance between a left end of the fourth hole 15 disposed in the left direction and a right end of the fourth hole 15 disposed in the right direction.

Note that in the first embodiment, for the convenience of description, while only the second protrusions 18 corresponding to the second holes 13 are shown in FIGS. 4A and 4B and FIGS. 5A and 5B, the second protrusions 18 having the same structure may be formed to correspond to the first holes 12. Specifically, the second protrusions 18 as shown in FIGS. 4A and 4B may be formed to correspond to the first holes 12 formed in the right direction of the separator 10. In this case, the second protrusions 18 are formed integrally with the corresponding first flow path walls 11. Accordingly, since the second protrusions 18 are formed integrally with the corresponding first flow path walls 11, there is no clearance between the second protrusions 18 and the corresponding first flow path walls 11, thereby preventing water from remaining. In addition, in place of being formed integrally with the corresponding first flow path wall 11, each of the second protrusions 18 may be configured by connecting a left end of the second protrusion 18 to the corresponding first flow path wall 11.

<<Fourth Protrusion 41>>

Figure 6:
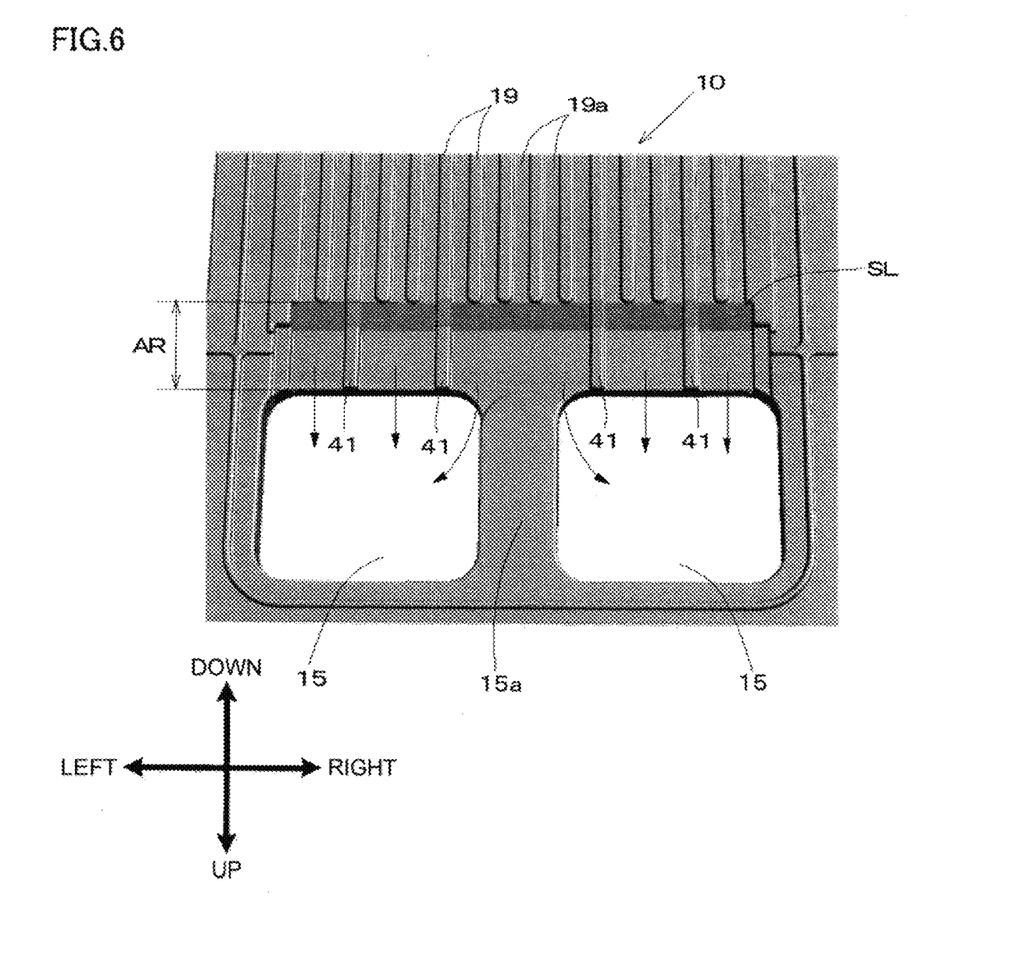
FIG. 6 is a partial enlarged plan view showing the main portion of the separator according to the first embodiment.

As shown in FIG. 6, four fourth protrusions 41 having the same structure as the second protrusions 18 are formed in a region AR between upper ends of the second flow path walls 19 and the fourth holes 15. Like the second flow path walls 19, the fourth protrusions 41 are each a protrusion formed integrally with the corresponding second flow path wall 19 on the surface of the metallic separator 10 through die casting. In this case, the fourth protrusions 41 protrude in the back direction. Since the fourth protrusions 41 are formed integrally with the corresponding second flow path walls 19, there is no clearance between each of the fourth protrusions 41 and the corresponding second flow path wall 19, thereby preventing water from remaining. Moreover, in place of being formed integrally with the corresponding second flow path wall 19, each of the fourth flow path walls 41 may be configured by connecting a lower end of the fourth protrusion 41 to the corresponding second flow path wall 19. Note that the second flow path wall(s) 19 which is not formed integrally with the fourth protrusion(s) 41 corresponds to a third protrusion(s) in claims.

Note that in the first embodiment, for the convenience of description, while only the fourth protrusions 41, corresponding to the fourth holes 15 are shown in FIG. 6, the fourth protrusions having the same structure may be formed to correspond to the third holes 14. In this case, the fourth protrusions 41 are formed integrally with the corresponding second flow path walls 19. Accordingly, since the fourth protrusions 41 are formed integrally with the corresponding second flow path walls 19, there is no clearance between the fourth protrusions 41 and the corresponding second flow path walls 19, thereby preventing water from remaining. In addition, in place of being formed integrally with the corresponding second flow path wall 19, each of the fourth protrusions 41 may be configured by connecting a lower end of the fourth protrusion 41 to the corresponding second flow path wall 19.

Second Embodiment

Next, a separator and a polymer electrolyte fuel cell comprising the same according to a second embodiment of the present disclosure will be described with reference to FIGS. 7A and 7B. In addition, in the second embodiment, the same structures as in the first embodiment are designated by the same reference numerals, and detailed description thereof will be omitted.

Figure 7A:
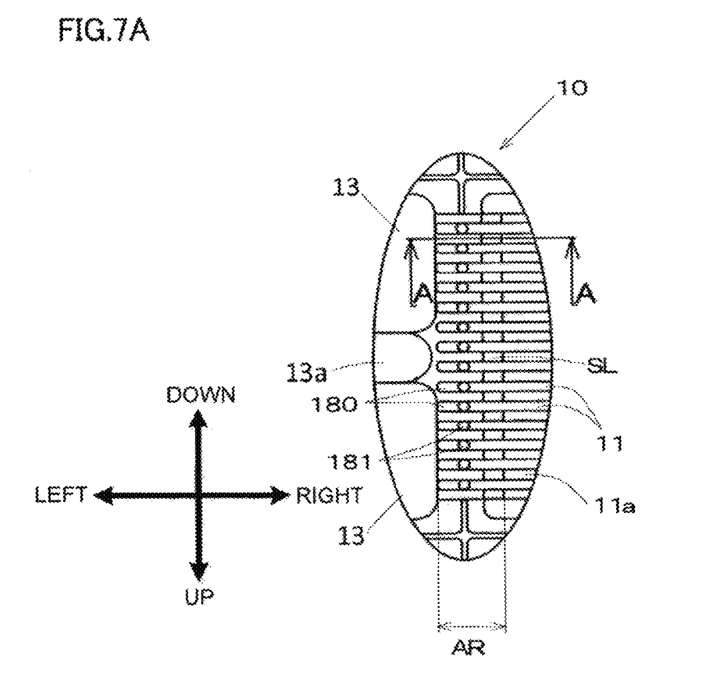
FIG. 7A is a partial plan view showing a main portion of a separator 10 according to a second embodiment.
Figure 7B:
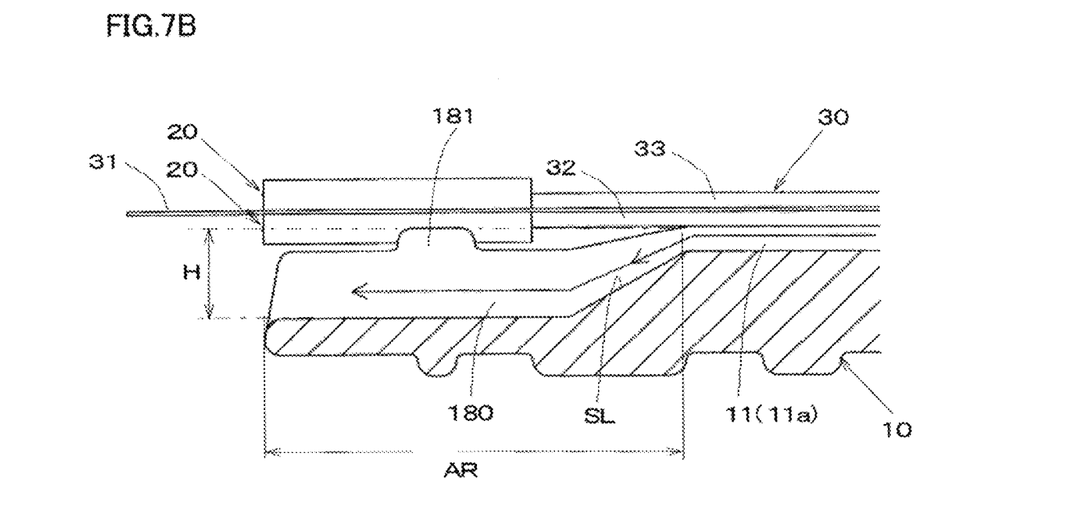
FIG. 7B is a cross-sectional view taken along a line A-A of FIG. 7A.

In FIGS. 7A and 7B, in the second embodiment, structures of the second protrusions 180 of the separator 10 are modified, and the bridge plate 29 (see FIG. 5B) used in the first embodiment is eliminated.

In the embodiment, as shown in FIG. 7A, all of the first flow path walls 11 of the separator 10 are formed integrally with the second protrusions 180, respectively. In addition, a projection 181 protruding in the front direction is formed at a substantially center, in the right-and-left direction, of top portion of each second protrusion 180. Here, in the second embodiment, as shown in FIG. 7B, the height of the second protrusion 180 in the front-and-back direction is larger than that of the second protrusion 18 (see FIG. 5B) of the first embodiment in the front-and-back direction. Then, a total height of the second protrusion 180 and the projection 181 is set to H.

According to the separator 10 of the embodiment having the above-mentioned structure, as all of the first flow path walls 11 are formed integrally with the second protrusions 180, a distance between the two adjacent second protrusions 180 is reduced. Accordingly, bending of the gasket 20 in the front-and-back direction is prevented without the bridge plate 29 shown in FIG. 5B. In addition, in the region AR, when a portion of the gasket 20 is supported by the second protrusions 180, the projections 181 abut the gasket 20, and a partial positional error of the gasket 20 is reliably prevented.

<Effects>

In the separator 10 and the polymer electrolyte fuel cell 1 comprising the same according to the first and second embodiments, the bending of the gasket 20 and the residue of the water are simultaneously solved by the second protrusion 18 and the second protrusion 180, thereby ensuring improved power generation capacity.

<Other Modifications>

The separator and the polymer electrolyte fuel cell comprising the same according to the present disclosure are not limited to the structures of the first and second embodiments. For example, in the embodiments, while the outer shape of the separator 10 is a substantially rectangular shape having long sides and short sides, the outer shape of the separator 10 is not particularly limited thereto but may be modified into an arbitrary shape.

In addition, for example, in the above-described embodiment, while the plurality of first flow path walls 11 of the oxidizing gas are of a straight type and the plurality of second flow path walls 19 of the fuel gas are of a serpentine type, the structures are not particularly limited thereto. For example, a design of the first flow path walls 11 and the second flow path walls 19 may be freely changed. Accordingly, the positions of the first holes 12, the second holes 13, the third holes 14 and the fourth holes 15 are not limited to the positions of the embodiments either.

Furthermore, although the air-cooling type separator 10 has been exemplified in the embodiments, the second protrusion of the present disclosure can be applied to a water-cooling type separator including a hole through which cooling water passes.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A fuel cell comprising:
   a membrane electrode assembly having a planar shape;
   a first separator having a planar shape and provided on one surface of the membrane electrode assembly, the first separator including:
   a first protrusion formed over a region between a first position which is provided a first distance apart from a first hole being pierced in the first separator and a second position which is provided a second distance apart from a second hole being pierced in the first separator, on a first surface opposed to the membrane electrode assembly, the first protrusion abutting the membrane electrode assembly;

an inclined-surface part formed on the first surface and descending from the second position to a predetermined position located between the second position and the second hole;

a planar-surface part formed on the first surface and connecting the inclined-surface part to the second hole; and a second protrusion formed over a region between the second position and the second hole on the first surface and connected to the first protrusion at the second position, the second protrusion continuously extending from the second position through the inclined-surface part and the planar-surface part to the second hole;

a gasket with through-holes being pierced in the gasket at positions corresponding to the first hole and the second hole, respectively; and a supporting section supporting the gasket and provided between the gasket and the second protrusion at a position corresponding to the planar-surface part.

2. The fuel cell according to claim 1, wherein the second protrusion is further formed over a region between the first hole and the first position and is connected to the first protrusion at the first position.

3. The fuel cell according to claim 1, further comprising a second separator having a planer shape and provided on the other surface of the membrane electrode assembly, the second separator including:

a third protrusion formed over a region between a third position which is provided a third distance apart from a third hole being pierced in the second separator and a fourth position which is provided a fourth distance apart from a fourth hole being pierced in the second separator, on a second surface opposed to the membrane electrode assembly, the third protrusion abutting the membrane electrode assembly; and a fourth protrusion formed over a region between the fourth position and the fourth hole on the second surface and connected to the third protrusion at the fourth position, the fourth protrusion continuously extending from the fourth position to the fourth hole.

4. The fuel cell according to claim 3, wherein the fourth protrusion is further formed over a region between the third hole and the third position and is connected to the third protrusion at the third position.

5. The fuel cell according to claim 1, wherein the first separator has a shape of a rectangle, and the first separator includes the first hole formed at a side of an one shorter side of the rectangle and the second hole formed at a side of the other shorter side of the rectangle.

6. The fuel cell according to claim 1, wherein the supporting section is a bridge plate which is a component different from the first separator.

7. The fuel cell according to claim 1, wherein the first separator further includes a partition wall partitioning the second hole into two portions, and the second protrusion is not formed between the partition wall and the first protrusion.

* * * * *